US008886460B1

(12) United States Patent
Keoshkerian

(10) Patent No.: US 8,886,460 B1
(45) Date of Patent: Nov. 11, 2014

(54) MOBILE DEVICE NAVIGATION STATE APPLICATION PROGRAMMING INTERFACE

(71) Applicant: Google Inc., Mountain View, CA (US)

(72) Inventor: Matthew Arrek Keoshkerian, Seattle, WA (US)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/688,431

(22) Filed: Nov. 29, 2012

(51) Int. Cl.
*A01B 1/00* (2006.01)
*G06F 21/60* (2013.01)
*G01C 21/00* (2006.01)

(52) U.S. Cl.
CPC .............. *G06F 21/60* (2013.01); *G01C 21/00* (2013.01)
USPC ............................ 701/533; 701/454; 701/461

(58) Field of Classification Search
CPC ...... G01C 21/00; G01C 21/005; G01C 21/20; G01C 21/26; G01C 21/34; G01C 21/2667; G06F 21/60; G06F 21/71; G06F 21/606; G06F 21/629
USPC ......... 701/533, 409, 410, 420, 423, 454, 461, 701/532
See application file for complete search history.

(56) References Cited

U.S. PATENT DOCUMENTS

| 8,103,445 | B2 * | 1/2012 | Smith et al. | 701/425 |
| 8,700,236 | B1 * | 4/2014 | Berman | 701/16 |
| 2014/0168716 | A1 * | 6/2014 | King et al. | 358/473 |
| 2014/0180734 | A1 * | 6/2014 | Gibson et al. | 705/5 |

* cited by examiner

*Primary Examiner* — Richard Camby
(74) *Attorney, Agent, or Firm* — Brake Hughes Bellermann LLP

(57) ABSTRACT

A method includes providing a service to expose navigation events data generated by a maps navigation application on a Linux-based mobile computing device platform to a third party application. The method further includes making provisions for verification on the mobile computing device platform that the third party application is authorized to access the navigation events data, and for establishing an interprocess service connection to the third party application upon verification of authorization.

35 Claims, 3 Drawing Sheets

MOBILE DEVICE NAVIGATION STATE APPLICATION PROGRAMMING INTERFACE

TECHNICAL FIELD

This disclosure generally relates to applications for mobile computing devices.

BACKGROUND

Mobile and connected devices (e.g., smart phones, tablets, etc.), which provide Internet connectivity to device users on the move, are transforming patterns of social and business behavior. Consumers are increasingly integrating mobile behaviors into their lifestyles. There is a growing use of mobile applications, not merely mobile search browsers, for diverse purposes including automatically receiving varied information and communications.

Popular applications for mobile computing devices include "maps" applications that make varied geographic information available to users. The geographic information that these maps applications can provide includes, for example, geographic or cartographic maps, orthoimagery (aerial photographs), elevation, geographic names, hydrography, boundaries, transportation, structures and land cover, etc.

Further, mobile computing devices commonly incorporate location-determining technology (e.g., GPS), which can determine the instantaneous latitude and longitude co-ordinates ("GPS location") of the mobile computing devices. Other location-determining technologies (e.g., cell tower or wireless access point triangulation) are also available and in widespread use for determining the instantaneous geographic locations of mobile computing devices.

The geographic information provided by the maps applications can be based on the instantaneous locations of the mobile computing devices. The maps applications can, for example, include navigation functions that use device location to provide the same navigation information (e.g., street maps, turn-by-turn voice guidance and automatic rerouting, etc.) that is provided by stand-alone satellite navigation systems. However, Internet-connected maps applications can further use device location information in powerful web-searches to provide a slew of local "navigation state" information in addition to the geographic maps including, for example, current (snapped-to-road) location, intended destination, route to destination, traffic status, distance remaining, estimated arrival time, full place restaurant reviews and summaries from Zagat editors, detailed maps with 3D buildings, indoor mapping, public transportation information, zoomable street views, live traffic information, terrain, transit lines, route planners for traveling by foot, car, or bike, ride finders, urban business locator maps, etc. An example maps navigation application even plots out Wikipedia entries related to the device location.

Third party applications may have use for the navigation state information generated by a maps application, for example, to provide targeted location-based services or features to a mobile computing device user. However, considerations of user autonomy and privacy preclude unrestricted exposure of the navigation state information by the maps application to the third party applications.

Consideration is now being given to ways of implementing user approval or authorization procedures for exposure of the navigation state information generated by a maps application to third party applications.

SUMMARY

A mobile computing device (e.g., a smartphone, tablet, netbook) has a computing platform to launch applications. The computing platform (hereinafter "mobile computing device platform") includes a Linux-based operating system (e.g., an Android operating system), which governs hardware components (e.g., processor, memory, keypad, display, etc.) and other components and processes of the mobile computing device.

According to one general aspect, a computer-implemented method includes providing a service to publish navigation events data generated by a maps navigation application launched on a mobile computing device platform to a third party application. The method further includes making provisions for verification that the third party application is authorized to access the navigation events data and making provisions for establishing, upon authorization, an interprocess service connection to the third party application on the mobile computing device platform.

In another aspect, the method includes providing an application programming interface for the third party application to access the service on the mobile computing device platform. The method further includes making provisions for implementing a permission model in which user consent or authorization for access to the navigation events data is obtained (e.g., by prompting a user for consent) when the third party application is first installed on the mobile computing device, and permissions for access to the navigation events data are declared in control files of both the maps navigation application and the third party application.

In another aspect, the method includes making provisions for receiving a registration call from the third party application seeking access to the navigation events data, and initiating processes to establish an interprocess service connection to the third party application with a service binder. A service binder object may define an interface for interprocess communication via the mobile device computing platform. The method may further include making provisions for alerting the third party application when the interprocess service is connected. In a further aspect, the method includes making provisions for attachment of a navigation events listener by the third party application.

In a general aspect, the foregoing method is used to configure a mobile computing device to allow exposure of navigation events data generated by a maps navigation application to third party applications. A tangible computer-readable storage medium has instructions stored thereon, which instructions when executed by one or more microprocessors can cause a computer system to configure the mobile computing device according to the foregoing method to allow exposure of navigation events data generated by a maps navigation application to third party applications.

In a general aspect, a computing device has a computing platform to launch applications. The computing platform is supported by the one or more hardware components and other components of the computing device governed by an operating system. The operating system can be a Linux-based operation system. A maps navigation application in conjunction with the computing platform includes a service to selectively expose navigation events data generated by a maps navigation application. The computing platform in conjunction maps navigation application has provisions for verification that a third party application is authorized to access the navigation events data and for establishing an interprocess service connection between the third party application and the navigation events data generated by the maps navigation application.

BRIEF DESCRIPTION OF THE DRAWINGS

Like reference symbols in the various drawings indicate like elements.

DETAILED DESCRIPTION

Figure 1:
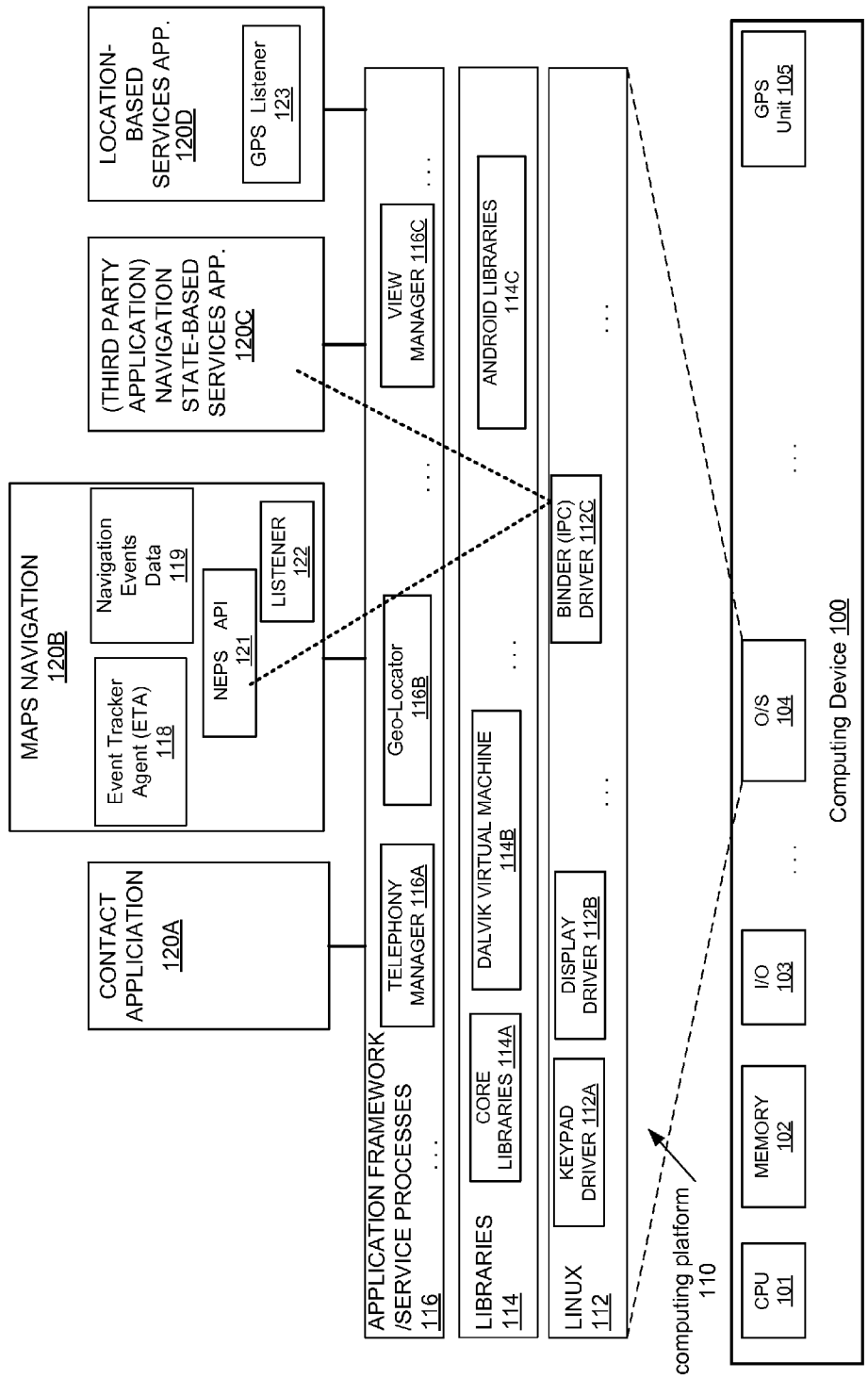
FIG. 1 is a schematic block diagram illustration of an example mobile computing device, which is configured to obtain user approval or authorization for exposure of navigation state information generated by a maps application to third party applications on the mobile computing device's computing platform, in accordance with the principles of the disclosure herein.

A mobile computing device is configured to obtain user approval or authorization for exposure of navigation state information generated by a maps application to third party applications on the mobile computing device's computing platform, in accordance with the principles of the disclosure herein.

Mobile computing devices (e.g., smartphones) may have vendor-specific operating systems. Common mobile operating systems (OS) used by modern smartphones include, for example, Android, iOS, Symbian, BlackBerry OS, Bada, Windows Phone, webOS, and embedded Linux distributions such as Maemo and MeeGo.

Android is a Linux-based operating system, which can scale from basic phones, to fully-featured smartphones, and to tablets and netbooks. Android, which is free and open source, has grown to become a favorite among mobile application developers. A burgeoning number of third party applications are being developed for the Android operating system by independent "third party" application developers. The Android operating system is used in the disclosure herein as an example or model operating system for a mobile computing device. However, it will be understood that the principles of the disclosure herein are not limited to the Android operating system, but are also applicable to other operating systems that may have the same or similar features as the Android.

It will be noted that Android is a privilege-separated operating system, in which each Android application is assigned a unique user ID (UID) and run under that UID in a separate process. An Android "permission" model enforces restrictions on the specific operations that a particular process can perform. Because Android sandboxes applications from each other, applications must explicitly share resources and data. A "basic" Android application has no permissions associated with it. To make use of protected or restricted features of the mobile computing device, the Android application's control file (e.g., AndroidManifest.xml) may include explicit declaration of the permissions requested by the application. One or more <uses-permission> tags may be used to declare the permissions requested by the application. For example, an application that needs to monitor incoming SMS messages may specify a permission in its control or "manifest" file as follows:

<manifest xmlns:androiti="http://schemas.android.com/apk/res/android" package="com.android.app.myapp">
<uses-permission android:name="android.permission.RECEIVE_SMS"/> . . .
</manifest>.

Similarly, an application that needs to control or restrict access to its activities or data may enforce its permissions by declaring them in its AndroidManifest.xml file using one or more <permission> tags.

High-level permissions may restrict access to entire components of the system or application. These may be implemented by including an android:permission attribute on the desired component, naming the permission that will be used to control access to it. An activity permission that can be applied to a <activity> tag may restrict who can start the associated activity. A service permission that can be applied to a <service> tag may restrict who can start or bind to the associated service. A BroadcastReceiver permission that can be applied to a <receiver> tag may restrict who can send broadcasts to the associated receiver. A ContentProvider permission that can be applied a <provider> tag) may restrict who can access the data in a ContentProvider.

Under the Android permission model, permissions requested by an application may be granted at application install time, based on checks against a certification or signature accompanying the application and/or interaction with the user.

FIG. 1 shows an example mobile computing device 100, which is configured to obtain user approval or authorization for exposure of navigation state information generated by a maps application to third party applications on the mobile computing device's computing platform, in accordance with the principles of the disclosure herein.

Mobile computing device 100, which may take the form of any of a number of different device types including, for example, a personal computer, laptop computer, tablet computer, netbook computer, a television, or a smartphone or web-enabled phone. Mobile computing device 100 may include a CPU 101, a memory 102, I/O 103 and O/S 104. CPU 101 may be any general processor, and memory 102 may be one or more storage devices configured to store data used by CPU 101 to perform certain functions. I/O 103 may be one or more devices that are used to communicate with computing devices, such as a keyboard, keypad, pointer, mouse, liquid crystal display (LCD) monitor, touch screen display, web camera, printer interface, modem, network card, etc. O/S 104 may be a Linux-based operating system. Mobile computing device 100 may include a browser that may be used to access various types of content. Such content may include web sites, photos, video, audio and executable scripts, and applications including, for example, a maps navigation application.

Mobile computing device 100 may have an example Android computing platform 110 governed by operating system O/S 104. Android computing platform 110 may include a Linux kernel 112, a libraries layer 114, and an application framework/services layer 116 to support applications (e.g., applications 120A-120D) that may be launched on mobile computing device 100.

In Android computing platform 110, Linux kernel 112, which is open source, may include services offered by the Linux kernel and associated GNU utility packages. These services may, for example, include one or more device drivers for hardware components of the computing device (e.g., keypad driver 112A, display driver 112B, etc.) and an interprocess communications binder driver (e.g., binder driver 112C). Libraries layer 114 may include open source libraries that are made available to all users of Android computing platform 110. Libraries layer 114 may, for example, include Android runtime components (e.g., core libraries 114A and Dalvik virtual machine 114B) and other select libraries (e.g., collectively Android Libraries 114C). Applications framework/services layer 116 may include further components (e.g., telephony manager 116A, geo-locator 116B, view manager 116C, etc.) that provide applications running on Android computing platform 110 with access to services or processes that are invisible to the user of the mobile computing device. Applications (e.g., applications 120A-120D) may communicate with these services via a message bus. For example, a contact application 120A might instigate a phone call at the behest of a user request by calling on the services of telephony manager 116A over the message bus. All code found in applications framework/services layer 116 (e.g., telephony manager 116A, geo-locator 116B, view manager 116C, etc.) may be closed source code that is written, for example, in Java, specifically for Dalvik virtual machine 114B.

Further, mobile computing device 100 may include location-awareness features (e.g., GPS navigation unit 105 and/or geo-locator 116B) that can determine the latitude and longitude coordinates of mobile computing device 100. Geo-locator 116B may, for example, be a solution that performs geolocation by associating a geographic location with the Internet Protocol (IP) address, MAC address, RFID, Wi-Fi connection location, or device GPS coordinates, or other self-disclosed user information.

Maps Navigation 120B, which may be a closed source code application launched on computing platform 110, may utilize device GPS coordinates and/or the geographical location determined by geo-locator 116B to generate navigational maps and other navigation state-based information (e.g., navigation events data 119) for the mobile computing device user. Maps Navigation 120B may also include an event tracker agent 118 configured to track navigational events and dynamically update the navigation state-based information with events.

Standard versions or configurations of Android computing platforms may not provide any suitable API to third party applications (e.g., Location-based services application 120D) for access to device location information or navigation events and data generated by Maps Navigation 120B. Instead, Location-based services application 120D may have to obtain the mobile computing device's GPS coordinates as determined by GPS navigation unit 105 by attaching a GPS listener. FIG. 1 shows, for example, Location-based services application 120D having a GPS listener 123 deployed to obtain GPS location information. GPS listener 123 may be implemented by a permission declaration "ACCESS_FINE_LOCATION" in the control file of Location-based services application 120D, for example, as follows:
<manifest> . . .
  <uses-permission
    android:name="android.permission.ACCESS_FINE_LOCATION"></uses-permission> . . .
</manifest>.

In accordance with the principles of the disclosure herein, a maps navigation application in conjunction with Android computing platform 110 includes a specific application programming interface (API)—"Navigation Events Publisher Service (NEPS)," that is configured to expose navigations events and data generated by the maps navigation application to third party applications. FIG. 1 shows such a service API (e.g., NEPS API 121) in a maps navigation application (e.g., Maps Navigation 120B) launched on Android computing platform 110. NEPS API 121 may be implemented using standard features of Android computing platforms.

NEPS API 121 may be configured to expose navigations events and data (hereinafter "navigation state" or "NEPS data") that are generated by Maps Navigation 120B to a third party application (e.g., Navigation state-based services application 120C). The NEPS data generated by Maps Navigation 120B may include data items such as current (snapped-to-road) location, intended destination, route to destination, traffic status, distance remaining, and estimated arrival time, etc. The data may be dynamic and may include events or changes to the data items.

A standard Android "Static Install-time Permission Model" may govern security and authorization for use of NEPS API 121 by the third party application. Under this model, user consent or authorization for access to NEPS data may be requested when the third party application (e.g., Navigation state-based services application 120C) is first installed on Android computing platform 110.

In an implementation of the permission model, permissions to share NEPS data may be required from both Maps Navigation 120B and the third party application (e.g., Navigation state-based services application 120C). The permissions required on the side of Navigation state-based services application 120C may include a permission defined by Maps navigation 120B in its manifest file in addition to a standard Android FINE_LOCATION permission.

An example permission definition in the manifest file of Maps navigation 120B may be as follows:
<permission
  android:name="com.google.android.apps.maps.NAVIGATION_DATA"
  android:label="Google Maps Navigation Data"
  android:description="Data such as current location, estimated time of arrival, distance to destination, current route and associated steps, and traffic along the route."
  android:protectionLevel="dangerous"/>.

An example permission declaration in the manifest file of the third party application (e.g., Navigation state-based services application 120C) may be as follows:
<?xml version="1.0" encoding="utf-8"?>
<manifest xmlns:android="http://schemas.android.com/apk/res/android"
  package="com.google.arriveabout"
android:versionCode="1" android:versionName="0.1">
<uses-permission
  android:name="com.google.android.apps.maps.NAVIGATION_DATA" />
<uses-permission android:name="android.permission.FINE_LOCATION"/>
<uses-permission android:name="android.permission.SEND_SMS"/>
<application android:icon="@drawable/icon"
  android:label="@string/app_name">
<activity android:name="com.google.arriveabout.ViewAlertActivity"
  android:theme="@android:style/Theme.Black"
  android:label="@string/app_name" android:launchMode="singleTask">
<intent-filter>
<action android:name="android.intent.action.MAIN"/>
<category android:name="android.intent.category.LAUNCHER"/>
</intent-filter>

```
</activity><service
    android:
        name="com.google.arriveabout.AlertDispatch-
        Service"
        android:label="@string/app_name"/>
<service                                    android:
    name="com.google.arriveabout.NavigationEvent-
    Subscriber"
    android:label="@string/app_name">
</service>
</application>
</manifest>.
```

In operation, Navigation state-based services application 120C, when first installed, may register for NEPS data updates by calling NEPS API 121 via Android computing platform 110. NEPS API 121/Android computing platform 110 may register Navigation state-based services application 120C, for example, upon confirming a user certification or signature for Navigation state-based services application 120C and verification of the permissions declared in its manifest file.

NEPS API 121 may respond to a request for access to NEPS data by having Linux kernel 112 (e.g., binder driver 112C) generate an Android binder (e.g., bindService) for establishing an interprocess service connection between Maps Navigation 120B and Navigation state-based services application 120C. NEPS API 121 may return a service binder object via the mobile device computing platform to the third party application. The service binder object may define an interface for interprocess communication, for example, via Binder (IPC) Driver 112C in Linux kernel 112. Further, NEPS API 121/Android computing platform 110 may alert Navigation state-based services application 120C that the interprocess service is connected. Once connected, Navigation state-based services application 120C may access the NEPS data. Navigation state-based services application 120C may, for example, attach a listener (e.g., NEPS listener 122) for navigation events, which may be triggered by location changes, traffic status changes, event tracker agent (ETA) changes, etc.

Figure 2:
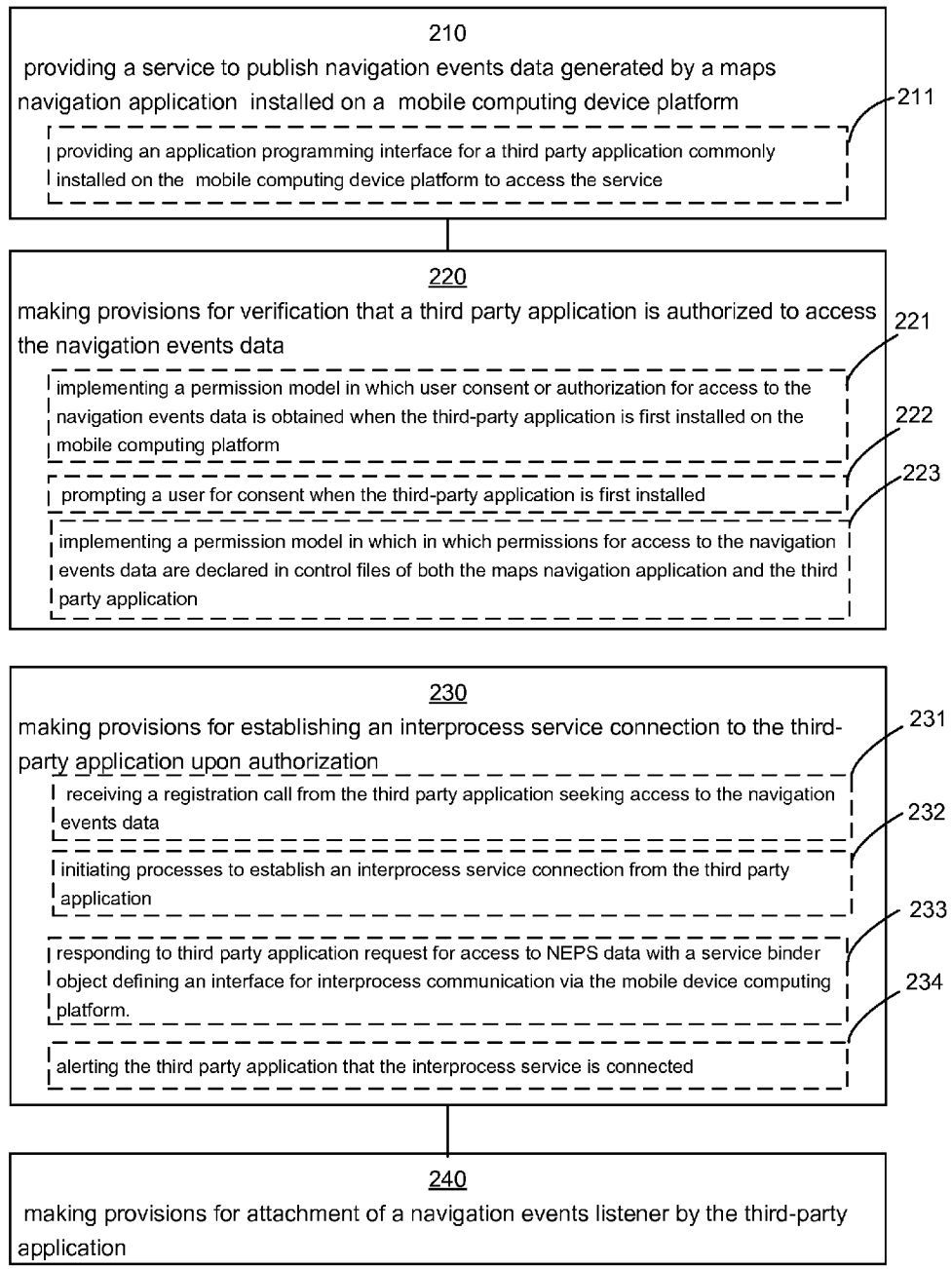
FIG. 2 is a flow chart illustrating an example method for configuring a mobile computing device to allow secure and authorized exposure of navigation state information generated by a maps application to third party applications on the mobile computing device's computing platform, in accordance with the principles of the disclosure herein.

FIG. 2 is a flow chart illustrating an example method 200 for configuring a mobile computing device 100 to allow secure and authorized exposure of navigation state information generated by a maps application to third party applications on the mobile computing device's computing platform, in accordance with the principles of the disclosure herein.

Method 200 includes providing a service to publish navigation events data generated by a maps navigation application launched on the mobile computing device platform (210), and making provisions for verification that a third party application is authorized to access the navigation events data (220) and making provisions for establishing an interprocess service connection to the third party application upon authorization (230).

Method 200 may be practiced in instances where the mobile computing device platform includes a Linux-based operating system (e.g., an Android operating system). The navigation events data generated by a maps navigation application may, for example, include one or more data items such as current snapped-to-road location, intended destination, route to destination, traffic status, distance remaining, and estimated arrival time, etc., and events or changes to such data items.

In method 200, providing a service to publish navigation events data generated by a maps navigation application 210 may include providing an application programming interface for the third party application to access the service (211).

Making provisions for verification that a third party application is authorized to access the navigation events data 220 may include implementing a permission model in which user consent or authorization for access to the navigation events data is obtained when the third party application is first installed on the mobile device computing platform (221), for example, by prompting a user for consent when the third party application is first installed (222). Further, making provisions for verification that a third party application is authorized to access the navigation events data 220 may include implementing a permission model in which permissions for access to the navigation events data are declared in control files of both the maps navigation application and the third party application (223).

Further in method 200, establishing an interprocess service connection to the third party application upon authorization 230 may include making provisions to receive a registration call from the third party application seeking access to the navigation events data (231) and initiate processes to establish an interprocess service connection to the third party application (232). The processes to establish an interprocess service connection to the third party application may include responding to third party application request for access to NEPS data with a service binder object defining an interface for interprocess communication via the mobile device computing platform (233).

In method 200, establishing an interprocess service connection to the third party application 230 may include alerting the third party application (e.g., via the mobile computing platform) that the interprocess service is connected (234). Method 200 may also include making provisions for attachment of a navigation events listener by the third party application (240).

A computer system may be deployed to practice method 200 in conjunction with a tangible computer-readable storage medium having instructions stored thereon. The instructions when executed by one or more microprocessors may cause the computer system to configure a mobile computing device according to method 200.

A computing device may include a computing platform supported by the one or more hardware components (e.g. at least one processor and at least one memory) that are governed by an operating system (e.g., a Linux-based operating system). A maps navigation application in conjunction with the computing platform may include a service to publish navigation events data generated by the maps navigation application, provisions for verification that a third party application is authorized to access the navigation events data and provisions for establishing an interprocess service connection to the third party application.

Figure 3:
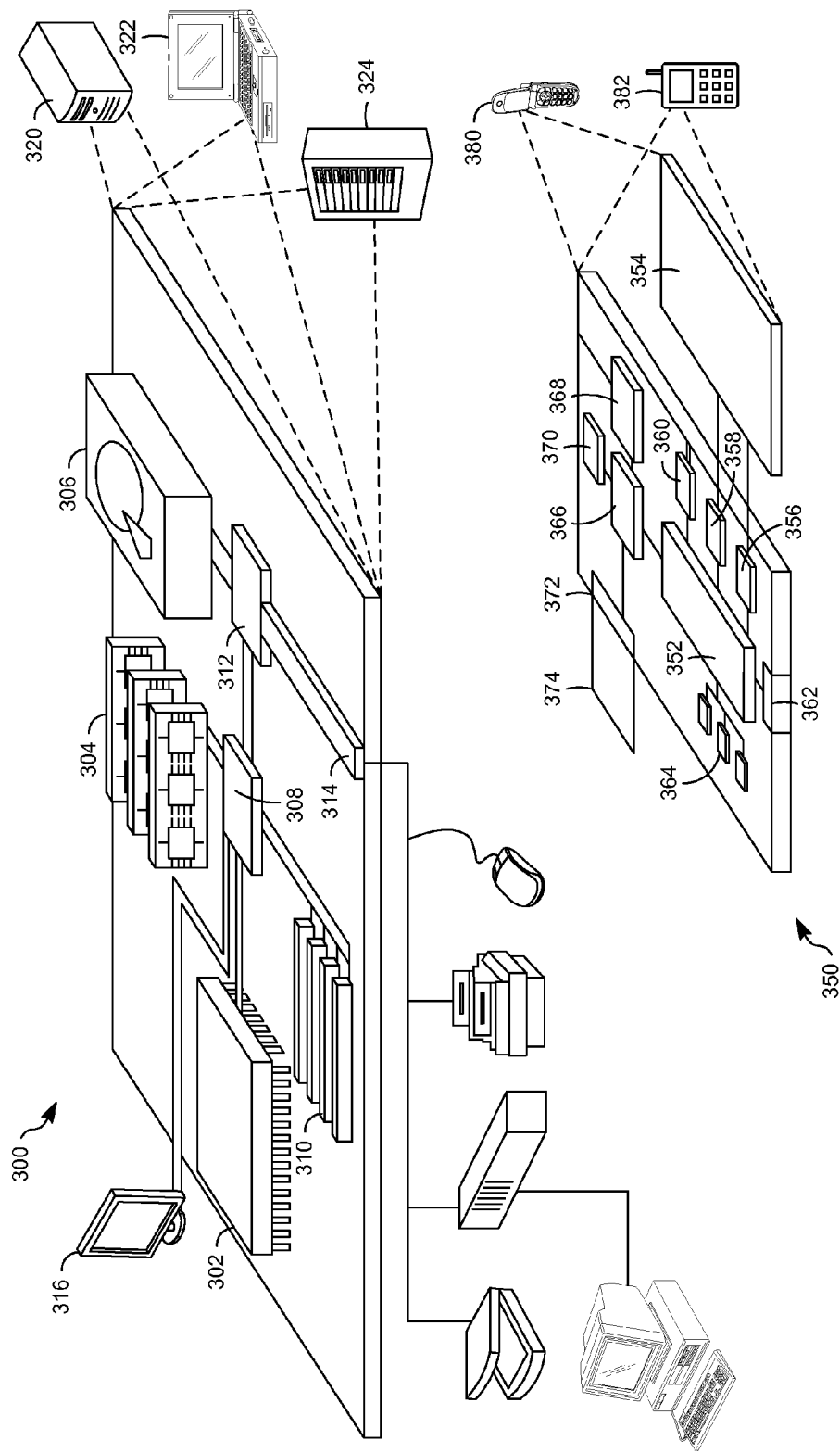
FIG. 3 is a schematic illustration of a generic computer device and a generic mobile computer device, which may be used with the techniques described herein.

FIG. 3 shows an example of a generic computer device 300 and a generic mobile computer device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, and an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wi-Fi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
providing a service to publish to a third party application navigation events data generated by a maps navigation application, wherein the third party application and the maps navigation application are different applications running on a mobile computing device platform;
making provisions for verification that the third party application is authorized to access the navigation events data; and
making provisions for, upon authorization, establishing an interprocess service connection from the third party application to the maps navigation application.

2. The method of claim 1, wherein the mobile computing device platform includes a Linux-based operating system.

3. The method of claim 1, wherein the mobile computing device platform includes an Android operating system.

4. The method of claim 1, wherein the navigation events data generated by the maps navigation application include one or more of: a current snapped-to-road location; an intended destination; a route to a destination; a traffic status; a distance remaining to a destination; and estimated arrival time at a destination.

5. The method of claim 1, wherein providing a service to publish navigation events data generated by a maps navigation application running on the mobile computing device platform includes:
providing an application programming interface for the third party application to access the service.

6. The method of claim 1, wherein making provisions for verification that the third party application is authorized to access the navigation events data includes:
implementing a permission model of the mobile computing device platform in which user consent or authorization for third-party access to the navigation events data is obtained when the third party application is first installed.

7. The method of claim 6, wherein implementing a permission model of the mobile computing device platform in which user consent or authorization for access to the navigation events data is obtained when the third party application is first installed includes:

prompting a user for consent for access to the navigation events data when the third party application is first installed on the mobile computing device platform.

8. The method of claim 1, wherein making provisions for verification that the third party application is authorized to access the navigation events data includes:
   implementing a permission model of the mobile computing device platform in which permissions for access to the navigation events data are declared in control files of both the maps navigation application and the third party application.

9. The method of claim 1, wherein making provisions for establishing an interprocess service connection from the third party application to the maps navigation application includes making provisions for:
   receiving a registration call from the third party application seeking access to the navigation events data; and
   initiating processes to establish an interprocess service connection from the third party application.

10. The method of claim 9, wherein making provisions to initiate processes to establish an interprocess service connection from the third party application includes making provisions for:
    responding to third party application request for access to data with a service binder object defining an interface for interprocess communication via the mobile device computing platform.

11. The method of claim 9, wherein making provisions to initiate processes to establish an interprocess service connection from the third party application includes making provisions for:
    alerting the third party application that the interprocess service is connected.

12. The method of claim 1, further comprising:
    making provisions for attachment of a navigation events listener by the third party application.

13. A tangible computer-readable storage medium having instructions stored thereon, which instructions when executed by one or more microprocessors cause a computer system to:
    provide a service to publish to a third party application navigation events data generated by a maps navigation application, wherein the third party application and the maps navigation application are different applications running on a mobile computing device platform;
    make provisions for verification that the third party application is authorized to access the navigation events data; and
    make provisions for, upon authorization, establishing an interprocess service connection to the third party application.

14. The tangible computer-readable storage medium of claim 13, wherein the mobile computing device platform includes a Linux-based operating system.

15. The tangible computer-readable storage medium of claim 13, wherein the mobile computing device platform includes an Android operating system.

16. The tangible computer-readable storage medium of claim 13, wherein the instructions when executed cause the computer system to provide an application programming interface for the third party application to access the service on the mobile computing device platform.

17. The tangible computer-readable storage medium of claim 13, wherein the instructions when executed cause the computer system to:
    implement a permission model in which user consent or authorization for access to the navigation events data is obtained when the third party application is first installed on the mobile computing device platform.

18. The tangible computer-readable storage medium of claim 13, wherein the instructions when executed cause the computer system to implement provisions for:
    prompting a user for consent for access to the navigation events data when the third party application is first installed on the mobile computing device platform.

19. The tangible computer-readable storage medium of claim 13, wherein the instructions when executed cause the computer system to:
    implement a permission model in which in which permissions for access to the navigation events data are declared in control files of both the maps navigation application and the third party application.

20. The tangible computer-readable storage medium of claim 19, wherein the instructions when executed cause the computer system to implement provisions for:
    receiving a registration call from the third party application seeking access to the navigation events data; and
    initiating processes to establish an interprocess service connection to the third party application.

21. The tangible computer-readable storage medium of claim 20, wherein the instructions when executed cause the computer system to implement provisions for:
    responding to a third party application request for access to data with a service binder object defining an interface for interprocess communication via the mobile device computing platform.

22. The tangible computer-readable storage medium of claim 21, wherein the instructions when executed cause the computer system to implement provisions for:
    alerting the third party application that the interprocess service is connected.

23. The tangible computer-readable storage medium of claim 13, wherein the instructions when executed cause the computer system to implement provisions for:
    attaching a navigation events listener to the third party application.

24. A computing device, comprising:
    one or more hardware components including at least one processor and at least one memory; and
    a computing platform supported by the one or more hardware components governed by an operating system,
    wherein the computing platform in conjunction with a maps navigation application includes:
       a service to publish navigation events data generated by the maps navigation application;
       provisions for verification that a third party application is authorized to access the navigation events data; and
       provisions for, upon authorization, establishing an interprocess service connection to the third party application,
    wherein the third party application and the maps navigation application are different applications running on the computing device platform.

25. The computing device of claim 24, wherein the operating system is a Linux-based operating system.

26. The computing device of claim 24, wherein the operating system is an Android operating system.

27. The computing device of claim 24, wherein the navigation events data generated by the maps navigation application include one or more of current snapped-to-road location, intended destination, route to destination, traffic status, distance remaining, and estimated arrival time.

28. The computing device of claim 24, wherein the maps navigation application includes:

an application programming interface for the third party application to access the service.

29. The computing device of claim 24, wherein the computing platform in conjunction with the maps navigation application is configured to implement a permission model in which user consent or authorization for access to the navigation events data is obtained when the third party application is first installed.

30. The computing device of claim 24, wherein the computing platform in conjunction with the maps navigation application is configured to prompt a user for consent for access to the navigation events data when the third party application is first installed.

31. The computing device of claim 24, wherein the computing platform in conjunction with the maps navigation application is configured to implement a permission model in which in which permissions for access to the navigation events data are declared in control files of both the maps navigation application and the third party application.

32. The computing device of claim 24, wherein the computing platform in conjunction with the maps navigation application is configured to:

receive a registration call from the third party application seeking access to the navigation events data; and initiate processes to establish an interprocess service connection to the third party application.

33. The computing device of claim 32, wherein the computing platform in conjunction with the maps navigation application is configured to:

respond to the third party application request for access to data with a service binder object defining an interface for interprocess communication via the computing platform.

34. The computing device of claim 32, wherein the computing platform in conjunction with the maps navigation application is configured to:

alert the third party application that the interprocess service is connected.

35. The computing device of claim 32, wherein the computing platform in conjunction with the maps navigation application is configured to:

making provisions for attachment to a navigation events listener by the third party application.

\* \* \* \* \*